(12) United States Patent
Risch

(10) Patent No.: US 9,459,428 B1
(45) Date of Patent: Oct. 4, 2016

(54) BUFFER TUBES HAVING REDUCED STRESS WHITENING

(71) Applicant: Draka Comteq B.V., Amsterdam (NL)

(72) Inventor: Brian G. Risch, Granite Falls, NC (US)

(73) Assignee: Draka Comteq, B.V., Amsterdam (NL)

( * ) Notice: Subject to any disclaimer, the term of this patent is extended or adjusted under 35 U.S.C. 154(b) by 243 days.

(21) Appl. No.: 14/467,450

(22) Filed: Aug. 25, 2014

Related U.S. Application Data

(62) Division of application No. 13/310,299, filed on Dec. 2, 2011, now Pat. No. 8,824,845.

(60) Provisional application No. 61/419,752, filed on Dec. 3, 2010, provisional application No. 61/454,094, filed on Mar. 18, 2011.

(51) Int. Cl.
*G02B 6/44* (2006.01)
(52) U.S. Cl.
CPC ............. *G02B 6/4482* (2013.01); *G02B 6/443* (2013.01)
(58) Field of Classification Search
CPC .................................................... G02B 6/4401
USPC ........................................................ 385/100
See application file for complete search history.

(56) References Cited

U.S. PATENT DOCUMENTS

| 4,807,078 | A | 2/1989 | Iwasa et al. |
| 4,838,643 | A | 6/1989 | Hodges et al. |
| 5,149,800 | A | 9/1992 | Kluger et al. |
| 5,290,921 | A | 3/1994 | Moody et al. |
| 5,574,816 | A | 11/1996 | Yang et al. |
| 5,717,805 | A | 2/1998 | Stulpin |
| 5,761,362 | A | 6/1998 | Yang et al. |
| 5,800,912 | A | 9/1998 | Ogiso et al. |
| 5,911,023 | A | 6/1999 | Risch et al. |
| 5,982,968 | A | 11/1999 | Stulpin |
| 6,035,087 | A | 3/2000 | Bonicel et al. |
| 6,066,397 | A | 5/2000 | Risch et al. |
| 6,085,009 | A | 7/2000 | Risch et al. |
| 6,134,363 | A | 10/2000 | Hinson et al. |
| 6,175,677 | B1 | 1/2001 | Yang et al. |
| 6,181,857 | B1 | 1/2001 | Emeterio et al. |
| 6,210,802 | B1 | 4/2001 | Risch et al. |
| 6,215,931 | B1 | 4/2001 | Risch et al. |
| 6,314,224 | B1 | 11/2001 | Stevens et al. |
| 6,321,012 | B1 | 11/2001 | Shen |

(Continued)

FOREIGN PATENT DOCUMENTS

| EP | 1921478 A1 | 5/2008 |
| WO | 02/081396 A1 | 10/2002 |

(Continued)

OTHER PUBLICATIONS

Hostacom EBS 777D White Product Sheet, Dec. 14, 2007, pp. 1-2.

(Continued)

*Primary Examiner* — Charlie Y Peng
(74) *Attorney, Agent, or Firm* — Additon, Higgins & Pendleton, P.A.

(57) ABSTRACT

Disclosed are buffer tubes of various colors having reduced stress whitening while retaining compliance with standard color requirements. In this regard, each buffer tube includes a polymeric tube that typically has a small amount of titanium dioxide. Each buffer tube typically demonstrates color compliance with the EIA Standard EIA-359-A.

21 Claims, 1 Drawing Sheet

(56) References Cited

U.S. PATENT DOCUMENTS

| | | |
|---|---|---|
| 6,321,014 B1 | 11/2001 | Overton et al. |
| 6,334,016 B1 | 12/2001 | Greer, IV |
| 6,381,390 B1 | 4/2002 | Hutton et al. |
| 6,421,486 B1 | 7/2002 | Daneshvar et al. |
| 6,448,312 B1 | 9/2002 | Oshima et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,700,106 B2 | 3/2004 | Cochran, II et al. |
| 6,719,742 B1 | 4/2004 | McCormack et al. |
| 6,749,446 B2 | 6/2004 | Nechitailo |
| 6,774,167 B1 | 8/2004 | Oepen et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,217,767 B2 | 5/2007 | Aguirre et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,449,522 B2 | 11/2008 | Aguirre et al. |
| 7,476,710 B2 | 1/2009 | Mehta et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,528,185 B2 | 5/2009 | Lee |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,824,845 B1 | 9/2014 | Risch |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0297107 A1 | 12/2009 | Tatat |
| 2009/0304338 A1 | 12/2009 | Davidson et al. |
| 2010/0021170 A1 | 1/2010 | Lumineau et al. |
| 2010/0092135 A1 | 4/2010 | Barker et al. |
| 2010/0092138 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0310218 A1 | 12/2010 | Molin et al. |
| 2011/0026889 A1 | 2/2011 | Risch et al. |
| 2011/0058781 A1 | 3/2011 | Molin et al. |
| 2011/0064367 A1 | 3/2011 | Molin et al. |
| 2011/0064731 A1 | 3/2011 | Chang |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |

FOREIGN PATENT DOCUMENTS

| | | |
|---|---|---|
| WO | 2005/111138 A1 | 11/2005 |
| WO | 2009/062131 A1 | 5/2009 |

OTHER PUBLICATIONS

Zaharescu et al., Nanostructured isotactic polypropylene-TiO2 systems, Journal of Optoelectronics and Advanced Materials, vol. 10, No. 9, Sep. 2008, pp. 2205-2209.

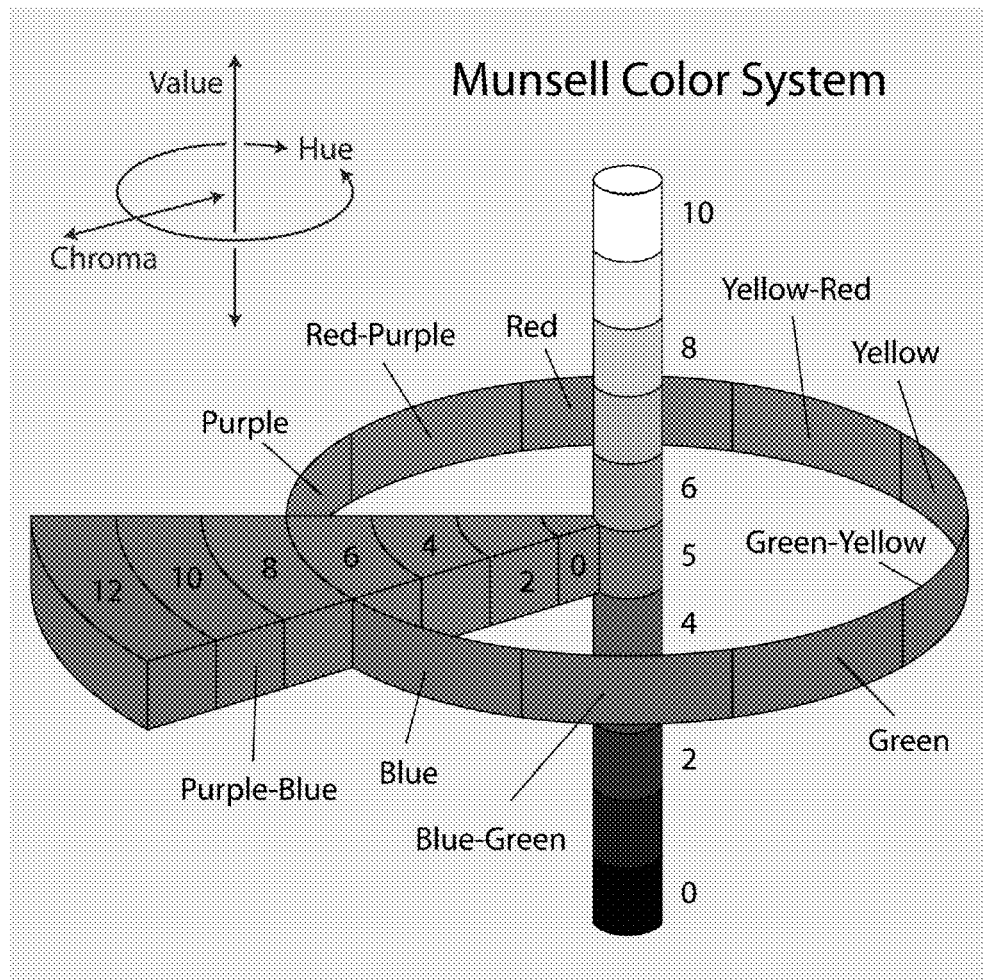

BUFFER TUBES HAVING REDUCED STRESS WHITENING

CROSS-REFERENCE TO PRIORITY APPLICATIONS

This application is a division of commonly assigned U.S. patent application Ser. No. 13/310,299 for Buffer Tubes Having Reduced Stress Whitening (filed Dec. 2, 2011), now U.S. Pat. No. 8,824,845, which itself claims the benefit of U.S. Patent Application Ser. No. 61/419,752 for Buffer Tubes Having Reduced Stress Whitening (filed Dec. 3, 2010) and U.S. Patent Application Ser. No. 61/454,094 for Buffer Tubes Having Reduced Stress Whitening (filed Mar. 18, 2011). Each of U.S. Patent Application Ser. No. 61/419,752, U.S. Patent Application Ser. No. 61/454,094, and U.S. application Ser. No. 13/310,299 is hereby incorporated by reference in its entirety.

FIELD OF INVENTION

The present invention relates to optical-fiber buffer tubes having reduced stress whitening while retaining compliance with standard color requirements.

BACKGROUND

As compared with traditional wire-based networks, optical-fiber communication networks are capable of transmitting significantly more information at significantly higher speeds. Optical fibers, therefore, are being increasingly employed in communication networks.

Within fiber optic networks, optical fibers are commonly positioned within buffer tubes. Depending upon the number of buffer tubes within a particular cable, industry standards require that each buffer tube be a particular color.

Polypropylene is often used to form buffer tubes because of its desirable mechanical properties. One problem associated with the use of polypropylene is that stress whitening can occur when polypropylene is plastically deformed. Such deformation can occur during the manufacture or installation of optical-fiber cables and buffer tubes.

Accordingly, a need exists for polypropylene buffer tubes that have reduced stress whitening while fully complying with industry color standards.

SUMMARY

The present invention embraces buffer tubes having small amounts of titanium dioxide. In this regard, buffer tubes in accordance with the present invention typically include a polymeric tube having at least about 80 weight percent homopolymer polypropylene and/or polypropylene copolymer. The polymeric tube also includes between about 200 and 8,000 ppm titanium dioxide (e.g., between about 700 and 1,200 ppm titanium dioxide). Typically, the buffer tube includes one or more optical fibers positioned within the polymeric tube. Buffer tubes in accordance with the present invention typically demonstrate color compliance with the EIA Standard EIA-359-A (e.g., as defined by the Munsell color system).

BRIEF DESCRIPTION OF THE DRAWING

FIG. 1 graphically depicts the Munsell color system.

DETAILED DESCRIPTION

In one aspect, the present invention embraces a polymeric composition that includes polypropylene modified with small amounts of titanium dioxide in order to reduce stress whitening.

More particularly, the present invention embraces optical-fiber buffer tubes possessing excellent stress-whitening properties. These buffer tubes also demonstrate color compliance with the EIA Standard EIA-359-A. These advantages have been demonstrated in polypropylene-based buffer tubes that include small amounts of titanium dioxide.

A buffer tube in accordance with the present invention includes a tube formed from one or more polymeric materials. In this regard, exemplary polymeric materials include polyolefin homopolymers (e.g., homopolymer polypropylene), polyolefin blends (e.g., a blend of polypropylene polymers and polyethylene polymers), and polyolefin copolymers (e.g., random or block polypropylene-polyethylene copolymer).

An exemplary optical-fiber buffer tube is formed of a polypropylene-based composition, such as impact-modified polypropylene. Those having ordinary skill in the art will appreciate that use of linear low-density polypropylene (LLDPE), low-density polypropylene (LDPE), and/or high-density polypropylene (HDPE) is within the scope of the present invention. In addition, polypropylene (e.g., isotactic polypropylene) may be combined with other polymers (e.g., other polyolefins), such as polyethylene.

The polymeric tube typically includes at least about 80 weight percent homopolymer polypropylene and/or polypropylene copolymer. More typically, the polymeric tube includes at least about 90 weight percent (e.g., 95 weight percent or more) homopolymer polypropylene and/or polypropylene copolymer.

By way of further example, a satisfactory polypropylene copolymer might include between about 2 and 15 weight percent ethylene monomers and polyethylene oligomers that are randomly copolymerized into the polymer chains (e.g., between about 5 and 10 weight percent comonomer substitution).

Various polypropylene-based compositions are disclosed in the following U.S. patents, each of which is hereby incorporated by reference in its entirety: U.S. Pat. No. 5,574,816 for Polypropylene-Polyethylene Copolymer Buffer Tubes for Optical Fiber Cables and Method for Making the Same; U.S. Pat. No. 5,761,362 for Polypropylene-Polyethylene Copolymer Buffer Tubes for Optical Fiber Cables and Method for Making the Same; and U.S. Pat. No. 5,911,023 for Polyolefin Materials Suitable for Optical Fiber Cable Components.

To facilitate ready identification of buffer tubes within a fiber-optic cable, the polymeric tube typically includes an identifying colorant so that the resulting buffer tube complies with industry color standards. Accordingly, in a particular aspect, the present invention embraces buffer tubes that are blue, orange, green, brown, red, or violet.

As noted, polypropylene-based buffer tubes are susceptible to undesirable stress whitening. Conventional blue, orange, green, brown, red, and violet buffer tubes are particularly susceptible to stress whitening.

That said, it has been discovered that the inclusion of small amounts of a whitening agent, typically titanium dioxide ($TiO_2$), reduces the incidence of unwanted stress whitening in blue, orange, green, brown, red, and violet buffer tubes (e.g., buffer tubes that have been subjected to significant plastic deformation). Thus, in order to achieve buffer tubes that demonstrate reduced stress whitening, these polymeric tubes include one or more whitening agents. Besides titanium dioxide, other exemplary inorganic whitening agents may include calcium carbonate ($CaCO_3$), talc, lithopone, antimony oxide, zinc oxide (ZnO), or lead carbonate ($PbCO_3$).

These polymeric tubes typically include small amounts of titanium dioxide. It should be emphasized that the concentration of titanium dioxide in each polymeric tube depends upon the desired color of the resulting buffer tube. This is so because an optical-fiber buffer tube must achieve not only satisfactory stress-whitening performance but also compliance with standard color requirements. Despite the inclusion of a whitening agent, blue, orange, green, brown, red, and violet buffer tubes in accordance with the present invention comply with industry color requirements.

Thus, red, brown, green, orange, and blue polymeric tubes typically include between about 100 and 10,000 ppm (parts per million) titanium dioxide (e.g., between about 200 and 8,000 ppm $TiO_2$), more typically less than about 7,500 ppm titanium dioxide. Even more typically, these polymeric tubes contain between about 200 and 5,000 ppm titanium dioxide, such as between about 500 and 2,500 ppm titanium dioxide (e.g., between about 700 and 1,500 ppm titanium dioxide). In one exemplary embodiment, these polymeric tubes contain between about 1,000 and 2,000 ppm titanium dioxide (e.g., between about 1,100 and 1,500 ppm titanium dioxide, such as about 1,300 ppm). In yet another exemplary embodiment, these polymeric tubes contain between about 700 and 1,200 ppm titanium dioxide (e.g., between about 950 and 1,150 ppm titanium dioxide). In a further exemplary embodiment, these polymeric tubes contain between about 1,500 and 3,000 ppm titanium dioxide (e.g., between about 2,000 and 2,500 ppm titanium dioxide).

Violet polymeric tubes typically include between about 100 and 10,000 ppm (parts per million) titanium dioxide (e.g., between about 200 and 8,000 ppm $TiO_2$), more typically less than about 7,500 ppm titanium dioxide (e.g., less than about 5,000 ppm titanium dioxide). Even more typically, violet polymeric tubes contain between about 200 and 2,000 ppm titanium dioxide, such as between about 200 and 1,200 ppm titanium dioxide (e.g., between about 400 and 1,000 ppm titanium dioxide). In one exemplary embodiment, violet polymeric tubes contain between about 200 and 600 ppm titanium dioxide. In yet another exemplary embodiment, violet polymeric tubes contain between about 800 and 1,200 ppm titanium dioxide (e.g., between about 950 and 1,150 ppm titanium dioxide). In a further exemplary embodiment, violet polymeric tubes contain between about 1,500 and 3,000 ppm titanium dioxide (e.g., between about 2,000 and 2,500 ppm titanium dioxide).

In another particular aspect, the present invention embraces buffer tubes that are slate, rose, or aqua.

Unlike, blue, orange, green, brown, red, and violet buffer tubes, slate, rose, and aqua buffer tubes have typically contained some amount of whitening agent (e.g., titanium dioxide) in order to achieve satisfactory color dimensions. Conventional slate, rose, and aqua buffer tubes, however, are still susceptible to stress whitening.

It has been discovered that adjusting the amount of whitening agent, typically titanium dioxide ($TiO_2$), reduces the incidence of unwanted stress whitening in slate, rose, and aqua buffer tubes (e.g., buffer tubes that have been subjected to significant plastic deformation). Besides titanium dioxide, other exemplary inorganic whitening agents may include calcium carbonate ($CaCO_3$), talc, lithopone, antimony oxide, zinc oxide (ZnO), or lead carbonate ($PbCO_3$).

Rose and aqua polymeric tubes typically include between about 4,000 and 12,000 ppm (parts per million) titanium dioxide, more typically between about 4,000 and 10,000 ppm titanium dioxide (e.g., between about 6,000 and 10,000 ppm titanium dioxide). Even more typically, these polymeric tubes contain between about 7,000 and 9,000 ppm titanium dioxide, such as between about 7,500 and 8,500 ppm titanium dioxide. In one exemplary embodiment, Rose and aqua polymeric tubes contain between about 6,000 and 8,000 ppm titanium dioxide. In yet another exemplary embodiment, Rose and aqua polymeric tubes contain between about 5,500 and 7,000 ppm titanium dioxide.

Buffer-tube color is typically defined by the Munsell color system, which is depicted in FIG. 1. In accordance with the Munsell color system, each color is defined by three color dimensions: (i) hue; (ii) value (i.e., lightness); and (iii) chroma (i.e., color purity). Table 1 (below) provides the typical Munsell-color-system dimensions of the present buffer tubes. More typically, the present buffer tubes have color dimensions at or near the centroid of the dimensions specified in Table 1. The Munsell-color-system dimensions depicted in Table 1 comply with industry standards.

TABLE 1

| Buffer-Tube | Munsell-Color-System Dimensions | | |
|---|---|---|---|
| Color | Hue | Value | Chroma |
| Blue | 7.5B-5PB | 3-5.2 | ≥8 |
| Orange | 10R-5YR | 5-7 | ≥10 |
| Green | 9GY-5G | 4-6 | ≥8 |
| Brown | 7.5R-7.5YR | 2.5-4.5 | 4.5-8 |
| Slate | ANY | 4-6 | ≤1 |
| Red | 10RP-5.5R | 3-5 | ≥10 |
| Violet | 10PB-5P | 3-5.5 | ≥5.5 |
| Rose | 5R-5RP | 6-8 | ≥4 |
| Aqua | 5B-5BG | 6-8 | ≥4 |

Accordingly, the present buffer tubes conform with the color specification defined in the EIA Standard EIA-359-A, which is hereby incorporated by reference in its entirety.

The whitening agent may be incorporated into the polymeric tube by mixing the whitening agent with a colorant (e.g., a blue color concentrate). This pre-mixture is then added to a base polymeric material (e.g., impact-modified polypropylene). For example, the pre-mixture and the base polymeric material may be mixed at an extruder, which is used to form the buffer tube.

By way of example, the whitening agent(s) may be incorporated into the polymeric tube via a masterbatch process. First, a polymeric masterbatch is created by mixing a carrier material (e.g., polypropylene) with proper amounts of the desired colorant (e.g., a red colorant) and whitening agent(s) (e.g., titanium dioxide). The polymeric masterbatch and the polymeric composition (e.g., polypropylene copolymer) are typically mixed in pelletized form at an extruder (e.g., continuously extruded about an optical fiber). In an exemplary process embodiment, an optical fiber is advanced through an extruder crosshead, which forms a molten polymeric buffer tube around the optical fiber. The molten polymeric buffer tube subsequently cools to form a final product (e.g., an optical-fiber buffer tube).

Buffer tubes in accordance with the present invention have demonstrated reduced stress whitening. In particular, 2.5-millimeter-diameter buffer tubes in accordance with the present invention have been evaluated by wrapping blue, orange, green, brown, slate, red, violet, rose, and aqua buffer tubes five times around an eight millimeter mandrel. The buffer tubes were evaluated for stress whitening both (i) during wrapping and (ii) after wrapping. It was observed that each colored buffer tube demonstrated no stress whitening (or at most minor stress whitening) both during wrapping and after wrapping.

By way of comparison, conventional colored buffer tubes were also evaluated in the same manner. Many of the conventional buffer tubes demonstrated moderate to severe stress whitening.

As noted, buffer tubes in accordance with the present invention comply with the color specification defined in the EIA Standard EIA-359-A. Indeed, exemplary blue, orange, green, brown, slate, red, violet, rose, and aqua buffer tubes have been tested to show color compliance. In particular, these colored buffer tubes were pre-conditioned for at least 24 hours at standard ambient conditions as defined in the TIA/EIA-455-B standard test procedure, which is hereby incorporated by reference in its entirety. After pre-conditioning, each buffer tube was tested with a Minolta™ CR-241 colorimeter. Each buffer tube demonstrated color compliance with the EIA Standard EIA-359-A.

One or more optical fibers may be positioned within a buffer tube according to the present invention.

In one embodiment, the polymeric tube includes one or more multimode optical fibers (e.g., conventional multimode fibers with a 50-micron core, such as OM2 multimode fibers, that comply with the ITU-T G.651.1 recommendations). The ITU-T G.651.1 standard (July 2007) is hereby incorporated by reference in its entirety. Exemplary multimode optical fibers that may be employed include Max-Cap™ multimode optical fibers (OM2+, OM3, or OM4) commercially available from Draka (Claremont, N.C.).

Alternatively, the present buffer tube may include bend-insensitive multimode fibers, such as MaxCap™-BB-OMx multimode fibers commercially available from Draka (Claremont, N.C.). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, in accordance with the ITU-T G.651.1 recommendations, standard multimode optical fibers have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, such standard multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

In another embodiment, the present buffer tube includes a plurality of standard single-mode fibers (SSMF). Suitable single-mode optical fibers (e.g., enhanced single-mode fibers (ESMF)) that are compliant with the ITU-T G.652.D recommendations are commercially available, for instance, from Draka (Claremont, N.C.). The ITU-T G.652 recommendations (November 2009) and each of its attributes (i.e., A, B, C, and D) are hereby incorporated by reference in their entirety.

In yet another embodiment, the present buffer tube includes a plurality of bend-insensitive single-mode optical fibers. Bend-insensitive single-mode optical fibers, which are less susceptible to attenuation (e.g., caused by microbending or macrobending), are commercially available from Draka (Claremont, N.C.) under the trade name BendBright®. BendBright® optical fibers are compliant with the ITU-T G.652.D recommendations. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). The ITU-T G.657.A/B recommendations are hereby incorporated by reference in their entirety.

In this regard, particularly outstanding bend-insensitive single-mode glass fibers for use in the present invention are commercially available from Draka (Claremont, N.C.) under the trade name BendBrightXS®. BendBrightXS® optical fibers are not only compliant with both the ITU-T G.652.D and ITU-T G.657.A/B recommendations but also demonstrate significant improvement with respect to both macrobending and microbending. As compared with such bend-insensitive single-mode optical fibers, conventional single-mode optical fibers typically not comply with either the ITU-T G.657.A recommendations or the ITU-T G.657.B recommendations, but do typically comply with the ITU-T G.652 recommendations (e.g., the ITU-T G.652.D recommendations).

As set forth in commonly assigned International Patent Application Publication No. WO 2009/062131 A1 for a Microbend Resistant Optical Fiber and U.S. Patent Application Publication No. US 2009/0175583 for a Microbend Resistant Optical Fiber, pairing a bend-insensitive glass fiber (e.g., Draka's single-mode glass fibers available under the trade name BendBrightXS®) and a primary coating having very low modulus achieves optical fibers having exceptionally low losses (e.g., reductions in microbend sensitivity of at least 10× as compared with a single-mode fiber employing a conventional coating system). Each of these patent publications is hereby incorporated by reference in its entirety.

The optical fibers deployed in the present buffer tubes may employ the coatings disclosed in International Patent Application Publication No. WO 2009/062131 A1 and U.S. Patent Application Publication No. US 2009/0175583 with either single-mode optical fibers or multimode optical fibers.

Optical fibers typically have an outer diameter of between about 235 microns and 265 microns, although the use of optical fibers having a smaller diameter is within the scope of the present invention.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns) and the secondary coating may have an outer diameter of between about 235 microns and 265 microns (i.e., a secondary coating thickness of between about 20 microns and 45 microns). At least one of the coating layers—typically the secondary coating—may be colored and/or possess other markings to help identify individual fibers. Optionally, the optical fiber may include an outermost ink layer, which is typically between two and ten microns.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns.

By way of example, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns). Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

In another alternative embodiment, the diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. Patent Publication No. US2011/0188826 A1 for a Non-Zero Dispersion Shifted Optical Fiber Having a Large Effective Area, filed Jan. 31, 2011, (Sillard et al.); U.S. Patent Publication No. US2011/0188823 A1 for a Non-Zero Dispersion Shifted Optical Fiber Having a Short Cutoff Wavelength, filed Jan. 31, 2011, (Sillard et al.); U.S. Patent Publication No. 2011/0217012 A1 for a Broad-Bandwidth Multimode Optical Fiber Having Reduced Bending Losses, filed Mar. 1, 2011, (Bigot-Astruc et al.); U.S. Patent Publication No. 2011/0229101 A1 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); U.S. patent application Ser. No. 13/206,943 for a Method of Fabricating an Optical Fiber Preform, filed Aug. 10, 2011, (de Montmorillon et al.); and U.S. patent application Ser. No. 13/275,921 for a Multimode Optical Fiber Insensitive to Bending Losses, filed Oct. 18, 2011, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Patent Application Publication No. US2010/0135623 A1 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. Patent Publication No. 2011/0176782 A1 for a Water-Soluble Water-Blocking Element, filed Jan. 19, 2011, (Parris); U.S. Patent Publication No. 2011/0268400 A1 for a Data-Center Cable, filed Apr. 28, 2011, (Lovie et al.); U.S. Patent Publication No. 2011/0268398 A1 for a Bundled Fiber Optic Cables, filed May 3, 2011, (Quinn et al.); U.S. patent application Ser. No. 13/111,147 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); U.S. patent application Ser. No. 13/152,651 for a Curing Apparatus Having UV Sources That Emit Differing Ranges of UV Radiation, filed Jun. 3, 2011, (Gharbi et al.); U.S. patent application Ser. No. 13/181,762 for a Adhesively Coupled Optical Fibers and Enclosing Tape, filed Jul. 13, 2011, (Parris); U.S. patent application Ser. No. 13/206,601 for a Method and Apparatus Providing Increased UVLED Intensity, filed Aug. 10, 2011, (Overton); and U.S. patent application Ser. No. 13/222,329 for an Optical-Fiber Module Having Improved Accessibility, filed Aug. 31, 2011, (Tatat).

In the specification and/or FIGURE, typical embodiments of the invention have been disclosed. The present invention is not limited to such exemplary embodiments. The use of the term "and/or" includes any and all combinations of one or more of the associated listed items. The FIGURE is a schematic representation and so is not necessarily drawn to scale. Unless otherwise noted, specific terms have been used in a generic and descriptive sense and not for purposes of limitation.

The invention claimed is:

1. A brown buffer tube, comprising:
a polymeric tube that includes (i) at least about 80 weight percent homopolymer polypropylene and/or polypropylene copolymer and (ii) between about 100 and 10,000 ppm titanium dioxide;
wherein, in conformance with the color specification defined in the EIA Standard EIA-359-A and with reference to the Munsell color system, the buffer tube has (i) a hue of 7.5R to 7.5YR, (ii) a value of 2.5 to 4.5, and (iii) a chroma of 4.5 to 8.

2. The brown buffer tube according to claim 1, comprising one or more optical fibers positioned within said polymeric tube.

3. The brown buffer tube according to claim 1, wherein said polymeric tube comprises between about 500 and 2,500 ppm titanium dioxide.

4. The brown buffer tube according to claim 1, wherein said polymeric tube comprises more than 1,000 ppm titanium dioxide and less than 2,000 ppm titanium dioxide.

5. The brown buffer tube according to claim 1, wherein said polymeric tube comprises (i) at least about 90 weight percent homopolymer polypropylene and/or polypropylene copolymer and (ii) between about 200 and 5,000 ppm titanium dioxide.

6. The brown buffer tube according to claim 5, wherein said polymeric tube comprises more than 700 ppm titanium dioxide and less than 1,200 ppm titanium dioxide.

7. The brown buffer tube according to claim 5, wherein said polymeric tube comprises more than 1,100 ppm titanium dioxide and less than 1,500 ppm titanium dioxide.

8. A green buffer tube, comprising:
a polymeric tube that includes (i) at least about 80 weight percent homopolymer polypropylene and/or polypropylene copolymer and (ii) between about 100 and 10,000 ppm titanium dioxide;
wherein, in conformance with the color specification defined in the EIA Standard EIA-359-A and with reference to the Munsell color system, the buffer tube has (i) a hue of 9GY to 5G, (ii) a value of 4 to 6, and (iii) a chroma of at least 8.

9. The green buffer tube according to claim 8, comprising one or more optical fibers positioned within said polymeric tube.

10. The green buffer tube according to claim 8, wherein said polymeric tube comprises between about 500 and 2,500 ppm titanium dioxide.

11. The green buffer tube according to claim 8, wherein said polymeric tube comprises more than 1,000 ppm titanium dioxide and less than 2,000 ppm titanium dioxide.

12. The green buffer tube according to claim 8, wherein said polymeric tube comprises (i) at least about 90 weight percent homopolymer polypropylene and/or polypropylene copolymer and (ii) between about 200 and 5,000 ppm titanium dioxide.

13. The brown buffer tube according to claim 12, wherein said polymeric tube comprises more than 700 ppm titanium dioxide and less than 1,200 ppm titanium dioxide.

14. The brown buffer tube according to claim 12, wherein said polymeric tube comprises more than 1,100 ppm titanium dioxide and less than 1,500 ppm titanium dioxide.

15. An orange buffer tube, comprising:
a polymeric tube that includes (i) at least about 80 weight percent homopolymer polypropylene and/or polypropylene copolymer and (ii) between about 100 and 10,000 ppm titanium dioxide;
wherein, in conformance with the color specification defined in the EIA Standard EIA-359-A and with reference to the Munsell color system, the buffer tube has (i) a hue of 10R to 5YR, (ii) a value of 5 to 7, and (iii) a chroma of at least 10.

16. The orange buffer tube according to claim 15, comprising one or more optical fibers positioned within said polymeric tube.

17. The orange buffer tube according to claim 15, wherein said polymeric tube comprises between about 500 and 2,500 ppm titanium dioxide.

18. The orange buffer tube according to claim 15, wherein said polymeric tube comprises more than 1,000 ppm titanium dioxide and less than 2,000 ppm titanium dioxide.

19. The orange buffer tube according to claim 15, wherein said polymeric tube comprises (i) at least about 90 weight percent homopolymer polypropylene and/or polypropylene copolymer and (ii) between about 200 and 5,000 ppm titanium dioxide.

20. The orange buffer tube according to claim 19, wherein said polymeric tube comprises more than 700 ppm titanium dioxide and less than 1,200 ppm titanium dioxide.

21. The orange buffer tube according to claim 19, wherein said polymeric tube comprises more than 1,100 ppm titanium dioxide and less than 1,500 ppm titanium dioxide.

* * * * *